June 14, 1955  M. E. SALLACH  2,710,958
PULSE ENCODER
Filed Aug. 7, 1946　　　　　　　　　　　　　　　　4 Sheets-Sheet 1
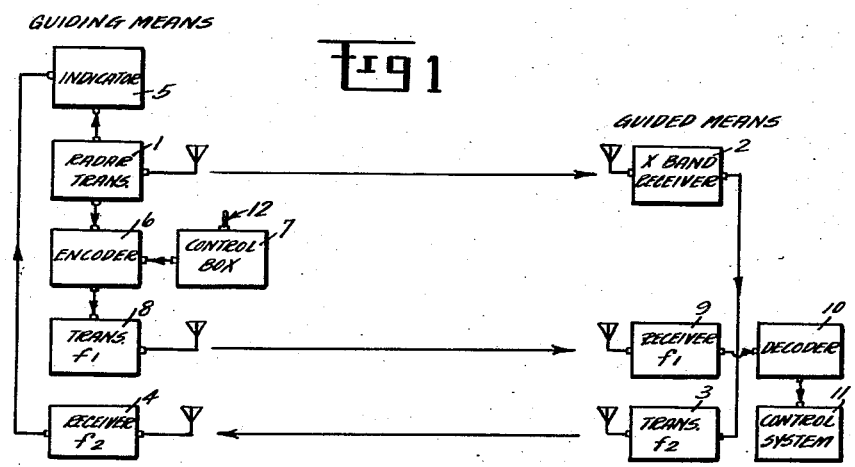
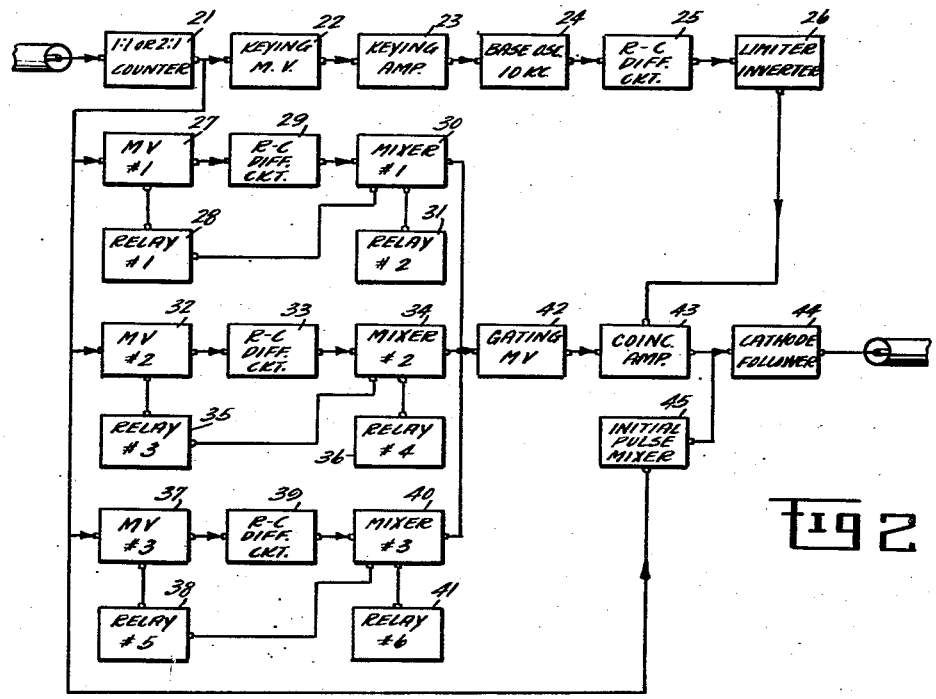
INVENTOR.
MAX E. SALLACH
BY
ATTORNEYS June 14, 1955  M. E. SALLACH  2,710,958
PULSE ENCODER
Filed Aug. 7, 1946  4 Sheets-Sheet 2
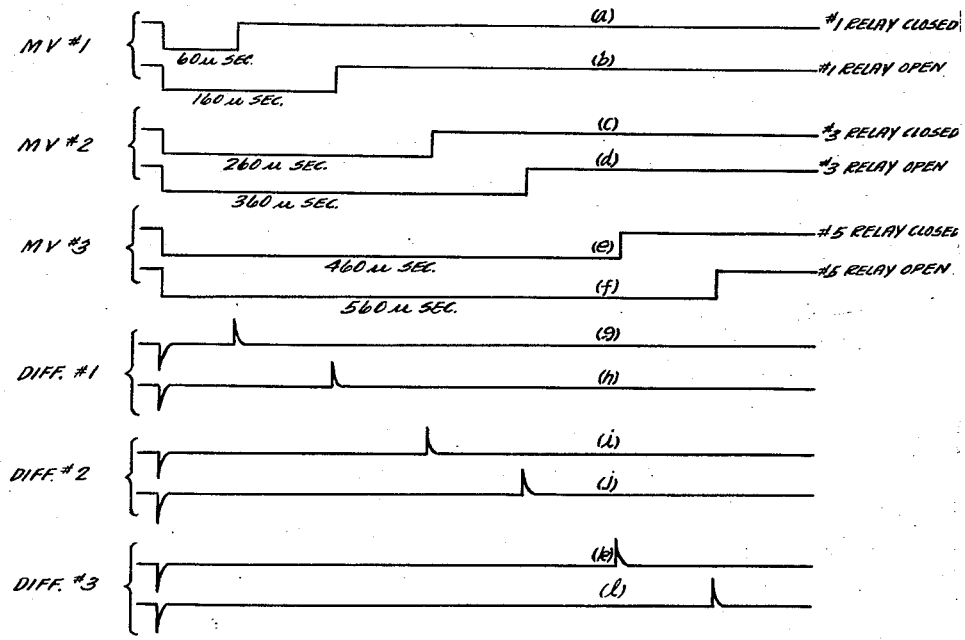
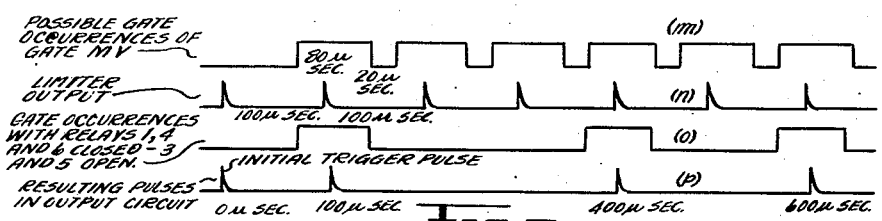
Fig 3
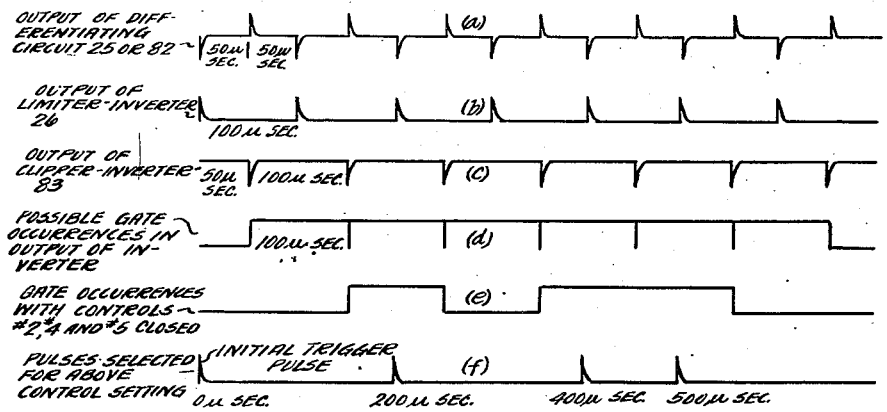
Fig 6
INVENTOR.
MAX E. SALLACH
BY
ATTORNEYS

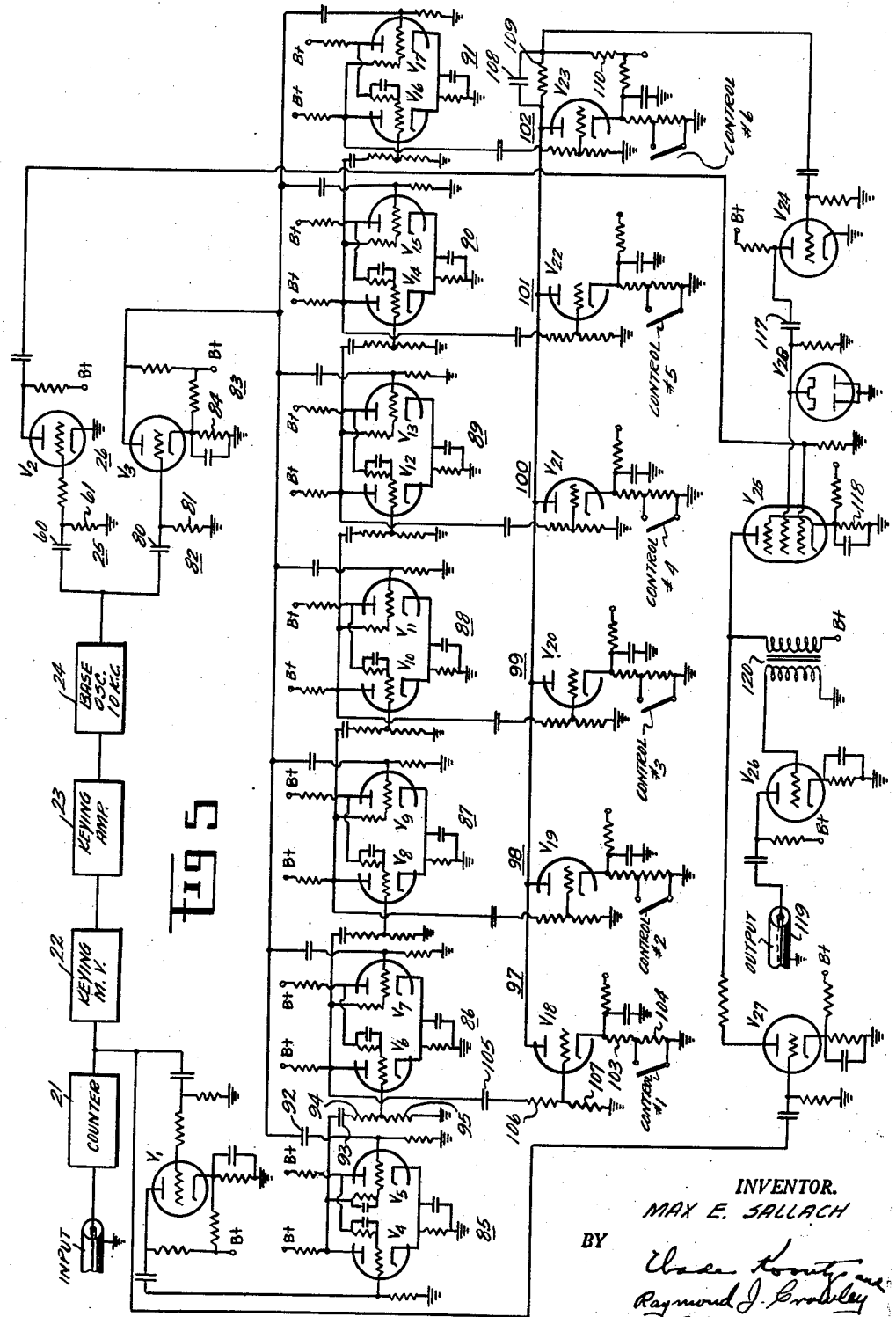

United States Patent Office 2,710,958
Patented June 14, 1955

2,710,958

PULSE ENCODER

Max E. Sallach, Dayton, Ohio

Application August 7, 1946, Serial No. 688,868

5 Claims. (Cl. 340—354)

(Granted under Title 35, U. S. Code (1952), sec. 266)

The invention described herein may be manufactured and used by or for the Government for governmental purposes without payment to me of any royalty thereon.

This invention relates to a pulse encoding device for use in radio control systems for moving bodies such, for example, as radio controlled aircraft or guided missiles. It is the object of this invention to provide a pulse encoder capable of causing one or more pulses to occur at predetermined intervals after an initial trigger pulse is applied to the unit.

In the drawings:

Fig. 1 is a simplified block diagram of a control system in which the invention may be used;

Fig. 2 is a block diagram of one embodiment of the encoder;

Fig. 3 shows a number of wave forms obtained in the encoder of Fig. 2;

Fig. 5 is the circuit diagram of another embodiment of the invention; and

Fig. 6 shows various wave forms useful in explaining the operation of Fig. 5.

Figure 4:
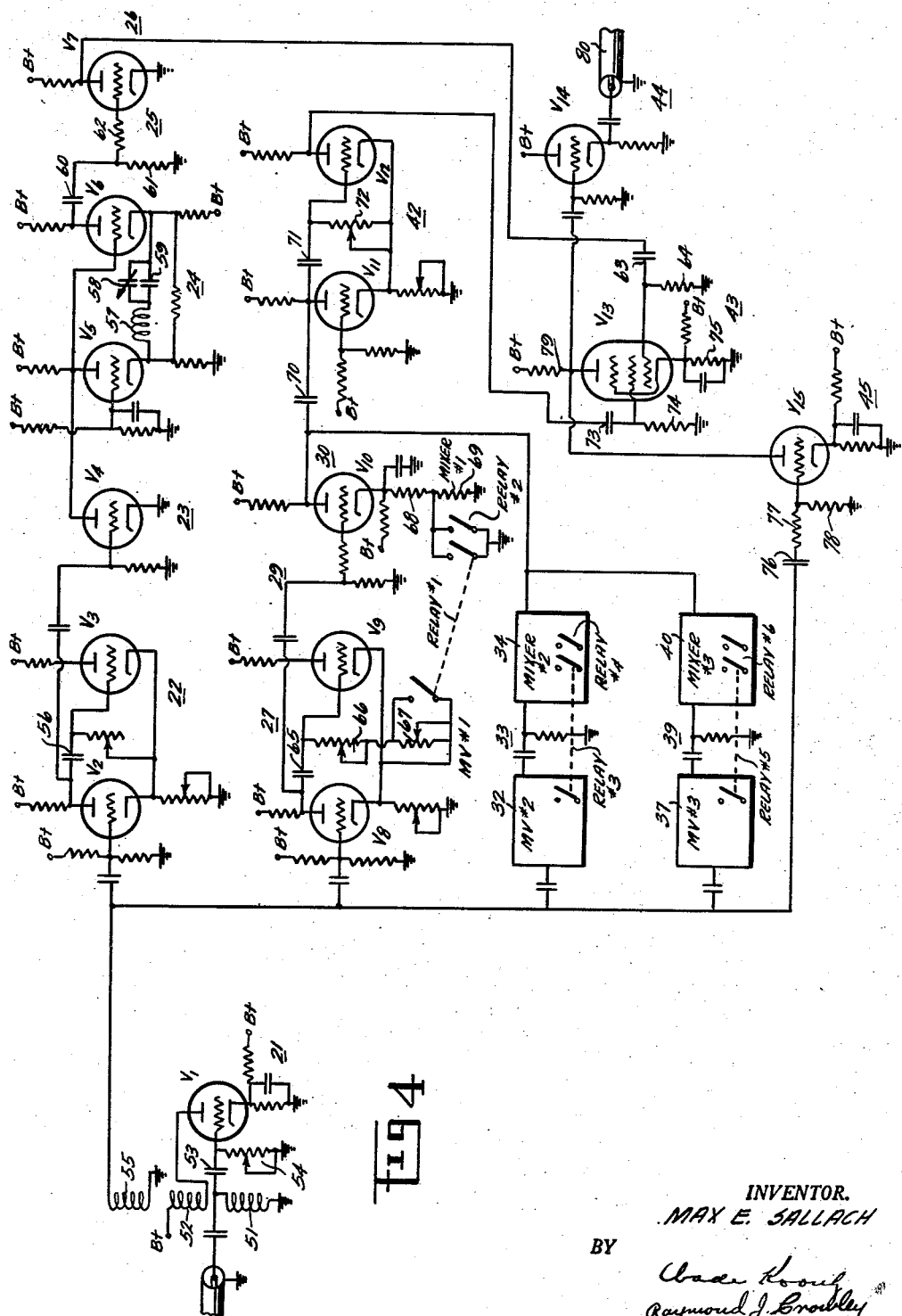
Fig. 4 is a schematic circuit diagram of the encoder of Fig. 2.

Referring to Fig. 1, there is shown a radio control system consisting of a guiding means and a guided means. The guiding means comprises a radar transmitter 1, which radiates pulses at regular intervals. These pulses are received by receiver 2 of the guided means and used to trigger transmitter 3 which transmits a pulse on another frequency to receiver 4. The output of receiver 4 is applied to the indicator 5 which gives information as to the position of the guided means. Provision in made for triggering the encoder 6 at the time at which a pulse is radiated by transmitter 1. The encoder then produces one or more pulses occuring at predetermined times after the initial triggering pulse. The number of pulses produced and the times at which they occur are determined by the position of the control stick 12 of control box 7. The pulses produced by the encoder are transmitted to receiver 9 by means of transmitter 8. The pulses from the output of receiver 9 are applied to decoder 10 which interprets the pulses received and causes corresponding control of the motion of the guided means through control system 11.

A block diagram of one embodiment of the encoder is shown in Fig. 2. In this embodiment the encoder output may consist of pulses occurring in any combination of the following groups of pulse intervals:

*Group I*

100 or 200 microseconds

*Group II*

300 or 400 microseconds

*Group III*

500 or 600 microseconds

The times indicated are the times at which the pulses occur after the occurrence of the initial trigger pulse.

In order to have the cycling period of the decoder independent of the pulsing rate of the radar transmitter, the counter 21 is provided which has the same pulsing rate in its output circuit for different pulsing rates in its input circuit. For example, if the radar transmitter has pulsing rates of 675 P. P. S. and 1350 P. P. S. to accommodate different target ranges, the counter is so designed that it will be triggered by each pulse when the pulsing rate is 675 P. P. S. and by every other pulse when the pulsing rate is 1350 P. P. S., thus producing a constant 675 P. P. S. output from the counter. The pulse obtained from the counter is used to trigger keying multivibrator 22 and the keying pulse produced thereby, after amplification by amplifier 23, is used to key the 10,000 C. P. S. oscillator 24. The duration of the keying pulse is sufficient to allow six complete cycles of the oscillator. The oscillator 24 is a form of multivibrator, the output wave of which is differentiated by circuit 25 to produce a series of twelve sharp pulses alternately positive and negative and spaced fifty microseconds apart. This series of pulses is applied to limiter-inverter 26 which eliminates the positive pulses and inverts the negative pulses so that there appears in the output circuit of 26 a series of six positive pulses spaced 100 microseconds apart, as shown in Fig. 3(n). This series of pulses is applied to coincidence amplifier 43.

The trigger pulse applied to the keying multivibrator by the counter is also applied to delay multivibrators 27, 32 and 37, each of which produces a delay pulse of negative polarity, the length of which is determined by the constants of the multivibrator circuits and the position of relays #1, #3 and #5. The different delay pulses that may be obtained from these multivibrators are shown in Fig. 3(a) through (f). The delay pulses produced by the delay multivibrators are applied to differentiating circuits 29, 33 and 39 which produce sharp positive pulses by differentiating the trailing edge of the delay pulse. The pulses that may be produced in this way and their possible times of occurrence are shown in Fig. 3(g) through (l). These pulses may be selectively applied to gating multivibrator 42 by means of mixers 30, 34 and 40. These mixers are rendered operative when relays #1, #3 and #5 are closed; they may also be rendered operative when relays #1, #3 and #5 are open by closing relays #2, #4 and #6. All relays are controlled by control box 7 of Fig. 1.

Pulses applied by the mixers to gating multivibrator 42 initiate a voltage gate having a duration of 80 microseconds. This gate is applied to the coincidence amplifier and renders it operative for the duration of the gate pulse. The possible gate occurrences of the gating multivibrator are shown in Fig. 3(m). It will be noted that the center of each gate pulse has the same position on the time axis as one of the pulses in the series of pulses applied to the coincidence amplifier by the limiter 26. Therefore, the coincidence amplifier will pass those pulses of the above mentioned series with which gating pulses coincide. Fig. 3(o) and (p) show the gate occurrences and the pulses selected for the condition in which relays #1, #4 and #6 are closed and relays #3 and #5 are open. The selected pulses are applied to the output transmission line through cathode follower coupling device 44.

In order to synchronize the operation of the decoder 10, Fig. 1, with that of the encoder, it is necessary to have the initial triggering pulse appear in the output circuit of the encoder. This is accomplished by the initial pulse mixer 45 of Fig. 2.

Fig. 4 shows the circuit details of the encoder shown in Fig. 2. The counter 21 is an oscillator stage having the amount of back coupling between coils 52 and 51 and the sizes of condenser 53 and resistor 54 of such values that the oscillator blocks during the first cycle of operation, thus producing a sharp pulse. The blocking is due to the charging of condenser 53 which reduces the grid potential below the cut-off point. The oscillator will remain blocked until the condenser 53 has discharged sufficiently to allow the grid potential to rise to the cut-off point, or until the grid potential is raised above the cut-off point by the application of a positive triggering pulse thereto. In the particular embodiment shown, the sizes of condenser 53 and resistor 54 are such that the natural period of the blocking oscillator is slightly greater than the pulse interval of the radar transmitter when the pulsing rate is 675 P. P. S. Therefore, when the pulsing rate is 675 P. P. S., each pulse triggers the blocking oscillator so that the pulsing rate in its output circuit is also 675 P. P. S. However, when the pulsing rate of the radar transmitter is increased to 1350 P. P. S., the oscillator 21 is triggered only by every other pulse since the next pulse following the triggering of the oscillator is not able to drive the grid of $V_1$ above cut-off due to the high negative potential on the grid at that time. By the time the next pulse has arrived, however, the condenser 53 has discharged sufficiently for the grid of $V_1$ to have nearly reached the cut-off potential, thus enabling this pulse to drive the grid above cut-off and to trigger the oscillator.

The keying multivibrator 22 is a conventional single cycle multivibrator having a stable condition in which the current in $V_3$ is a maximum and $V_2$ is cut-off. The application of a positive pulse to the grid of $V_2$ drives this grid above cut-off and initiates a rapid transition to the condition in which the current in $V_2$ is a maximum and $V_3$ is cut-off. This condition exists until the grid of $V_3$ rises to the cut-off potential as a result of the discharging of condenser 56. When the cut-off point is reached, the circuit rapidly returns to the initial stable condition with $V_3$ conducting and $V_2$ non-conducting. In passing through this cycle, the multivibrator generates a square pulse of negative polarity at the anode of $V_2$. The duration of this pulse is determined by the time constant of the discharge circuit of condenser 56 which is adjusted in this case to give a pulse length somewhat in excess of 600 microseconds.

The keying amplifier 23 amplifies and inverts the keying pulse and applies it to the oscillator 24. This oscillator is a form of multivibrator operating at 10,000 C. P. S. and having its frequency controlled by the resonant circuit formed by inductance 57 and condensers 58 and 59. The circuit oscillates during the time that the keying pulse is applied to it, the pulse being of sufficient length to allow six complete cycles to be produced. The output wave of oscillator 24 is applied to differentiating circuit 25 which consists of condenser 60 and resistor 61. This circuit converts the output of the oscillator into a series of twelve sharp pulses occurring at 50 microsecond intervals and of alternate positive and negative polarity. These pulses are applied to limiter-inverter 26 which is an amplifier operated at zero bias and having a resistor 62 in series with the grid. Due to the voltage drop across resistor 62 in the presence of grid current, it is impossible for the grid of tube $V_7$ to become more than slightly positive with respect to the cathode, hence positive pulses applied to this grid will not appear in the output circuit of $V_7$, but negative pulses will be amplified and inverted so that they appear in the output as positive pulses. The effect of the limiter-inverter, therefore, is to convert the output of the differentiating circuit into a series of six positive pulses occurring at 100 microsecond intervals. This series of pulses is applied to the control grid of tube $V_{13}$ of the coincidence amplifier 43 by means of condenser 63 and resistor 64.

The delay multivibrators 27, 32 and 37 are of the same type as keying multivibrator 22. In multivibrator 27 the time constant of the discharge path of condenser 65 is controlled by adjustable resistors 66 and 67. These resistors are set to values giving a pulse length of 60 microseconds with relay #1 closed and 160 microseconds with relay #1 open. Longer delay pulses are produced by multivibrators 32 and 37 as shown in Fig. 3. The differentiating circuits 29, 33 and 39 are identical to circuit 25 and are for the purpose of converting the trailing edge of the delay pulse into a sharp positive pulse. Mixer circuits 30, 34 and 40 are all identical. On mixer 30 the triode is biased beyond cut-off by the potential drop across resistors 68 and 69. Closing either relay #1 or relay #2 short-circuits resistor 69, thus lowering the cathode potential and reducing the bias of $V_{10}$ to an operable value. When either relay #1 or #2 is closed, the mixer amplifies and inverts the sharp positive pulse obtained from the differentiating circuit 29, thus producing a negative pulse in its output circuit which is applied through condenser 70 to gate multivibrator 42.

Multivibrator 42 is a one cycle multivibrator having a stable condition in which the current through $V_{12}$ is a maximum and $V_{11}$ is cut-off. Application of the negative triggering pulse from the mixer to the grid of $V_{12}$ through condenser 71 causes tube $V_{12}$ to be cut off and the current through $V_{11}$ to rapidly assume its maximum value. This condition exists until the grid potential of $V_{12}$ has risen to the cut-off point as a result of the discharging of condenser 71 at which time a rapid transition takes place to the original stable condition with $V_{12}$ conducting and $V_{11}$ cut off. The above described cycle of operation produces a positive pulse at the anode of $V_{12}$, the duration of which is determined by the time constant of the discharge circuit of condenser 71 which can be controlled by adjustable resistor 72 and which in this case is adjusted to give a pulse length of 80 microseconds. This gating pulse is applied to the screen grid of tube $V_{13}$ by means of condenser 73 and resistor 74. In the absence of a gating pulse, the negative bias on the screen grid produced by the potential drop across resistor 75 is sufficient to cut off the space current of $V_{13}$. When a positive gating pulse is applied to the screen grid of $V_{13}$, the stage is rendered operative for the duration of the pulse and any signals applied to the control grid during this time are passed by the stage. The time relationship between the gate pulses and the pulses applied to the control grid of $V_{13}$ by the limiter-inverter 26 has already been discussed in connection with Figs. 2 and 3.

The initial triggering pulse applied to multivibrators 22, 27, 32 and 37 is also applied to the control grid of $V_{15}$ by means of condenser 76 and resistors 77 and 78. The output load resistor of this stage is common with output load resistor 79 of $V_{13}$. In this way, the initial triggering pulse is made to appear in the output of coincidence amplifier 43. Tube $V_{14}$ and its associated circuit elements form a cathode follower impedance changing device for coupling the high impedance output circuit of pentode $V_{13}$ to the low impedance coaxial transmission line 80.

The embodiment of the encoder shown in Fig. 5 differs from that shown in Figs. 2 and 3 mainly in the manner in which the gating pulses are set up. Instead of employing a gating multivibrator controlled by delay multivibrators as in Figs. 2 and 3, a chain of trigger circuits is employed to produce a chain of 100 microsecond pulses. Pulses occurring at desired times are selected from this chain and applied to the coincidence amplifier by a number of mixer circuits. By this arrangement, it is possible to obtain any combination of six pulses in the encoder output.

Referring to Fig. 5, counter circuit 21, keying multivibrator 22, keying amplifier 23 and base oscillator 24 are the same in design and operation as those shown in Figs. 2 and 3, except that in this case the duration of the keying pulse should be sufficiently long to allow 6½ cycles of operation of the base ocsillator 24. The output of this oscillator is applied to differentiating circuit 25, comprising condenser 60 and resistor 61, and to differentiating circuit 82, comprising condenser 80 and resistor 81. These two circuits are identical and the output of each is a series of pulses having alternate polarities and spaced at 50 microsecond intervals as shown in Fig. 6(a). This series of pulses is converted into a series of positive pulses occurring at 100 microsecond intervals, as shown in Fig. 6(b), by the limiter-inverter stage 26 which is identical to and operates the same as limiter-inverter stage 26 of Figs. 2 and 3. The above mentioned series of pulses is also applied to the clipper-inverter stage 83 which comprises a triode $V_3$ biased to cut-off by means of the potential drop across resistor 84. When so biased, this stage passes only the positive pulses of the wave shown in Fig. 6(a) so that there occurs in the output circuit a series of pulses beginning 50 microseconds after the initial triggering pulse and occurring at 100 microsecond intervals thereafter as shown in Fig. 6(c). The polarity of these pulses is negative due to the inverting action of stage 83.

Trigger circuits 85 through 91 are of the Eccles-Jordan type, having two stages comprising, in circuit 85 for example, tubes $V_4$ and $V_5$ with the anode of $V_4$ coupled to the grid of $V_5$ and the anode of $V_5$ coupled to the grid of $V_4$. Due to the regenerative action of a circuit of this type, any current change in one of the tubes will continue in the same direction to the limit of either maximum current or zero current. Thus anything tending to reduce the current in $V_5$, such as lowering the grid potential, will cause the anode potential to rise and therefore the grid potential of $V_4$ to rise. The resulting increase in current in $V_4$ causes a reduction in anode potential of $V_4$ which causes a still further reduction in the grid potential and current of $V_5$. This process is rapid and continues until the current in $V_4$ is a maximum and that in $V_5$ is zero. This is one condition of equilibrium of the circuit. The circuit may be rapidly switched to the other condition of equilibrium, in which the current in $V_4$ is zero and that in $V_5$ is a maximum, by reducing the current in $V_4$, such as by the application of a negative pulse to its grid.

The manner in which this chain of trigger circuits operates to produce a series of gate pulses occurring at specified times after the initial triggering pulse is as follows: The initial positive trigger pulse, obtained from the output of counter 21, is converted into a negative pulse by inverter $V_1$ and applied to the grid of $V_4$. This results in the current in $V_4$ becoming zero and that in $V_5$ a maximum. This condition exists until, 50 microseconds later, the first of the series of negative pulses obtained from clipper-inverter stage 83 and shown in Fig. 6(c) is applied to the grid of $V_5$ through condenser 92, causing the circuit to be triggered back to its initial condition in which the current in $V_4$ is maximum and that in $V_5$ is zero. In this cycle of operation a positive pulse of 50 microseconds duration is produced on the anode of $V_4$. A sharp negative pulse is obtained from the trailing edge of this pulse by means of a differentiating circuit comprising condenser 93 and resistors 94 and 95. This negative pulse is applied to the grid of $V_6$, causing its current to be reduced to zero and the current in $V_7$ to become a maximum. This condition exists for a period of 100 microseconds at the end of which the second negative pulse in the series of Fig. 6(c) is applied to the grid of $V_7$ through condenser 96, resulting in the circuit being triggered back to its initial condition with the current in $V_6$ a maximum and in $V_7$ zero. During this cycle of operation a positive pulse of 100 microsecond duration is produced at the anode of $V_6$. As in the preceding stage, the trailing edge of this pulse is differentiated and the resulting sharp negative pulse applied to the grid of $V_8$. By the process described for circuit 86, the remaining circuits produce a succession of positive 100 microsecond pulses until finally the last pulse of the series shown in Fig. 6(c) is applied to the grid of $V_{17}$ to return circuit 91 to its initial condition in which the current in $V_{16}$ is a maximum and that in $V_{17}$ is zero.

Mixing stages 97 through 102 are all identical and comprise, referring to circuit 97 as an example, a triode $V_{18}$ biased beyond cut-off by the potential drop across resistors 103 and 104. A switch marked "control #1" is provided for short circuiting resistor 104 and thus reducing the bias on $V_{18}$ to an operable value. The grid of $V_{18}$ is coupled to the anode of $V_6$ by means of condenser 105 and resistors 106 and 107. Likewise each of the grids of the remaining mixer stages are coupled to the anode of the first tube in one of the remaining trigger circuits. The mixer stages have a common output impedance formed by condenser 108 and resistors 109 and 110. The pulses obtained from the trigger circuits are reversed in polarity by the mixer stages and appear across resistor 110 as negative pulses. These pulses are amplified by amplifier $V_{24}$, which again reverses their polarity, and applied as gating pulses to the screen grid of coincidence amplifier $V_{25}$. The clamping diode $V_{28}$ is for the purpose of restoring the d. c. component lost because of the coupling condenser 117. Controls #1 through #6 may be actuated by stick 12 of control box 7 in Fig. 1.

The series of positive pulses obtained from the output of limiter-inverter 26 and shown in Fig. 6(b) is applied to the control grid of coincidence amplifier $V_{25}$. The negative potential on the screen grid, produced by the drop across resistor 118, is sufficient to bias $V_{25}$ to cut-off in the absence of a gating pulse. When a gating pulse is applied to the screen grid of $V_{25}$, the tube is rendered operative and passes the pulse of the above-mentioned series occurring during the time of the gating pulse. The time relationship between the pulses of this series and the gating pulses may be seen by comparing Fig. 6(b) with Fig. 6(d). The gate occurrence with controls #2, #4 and #5 closed is shown in Fig. 6(e) while the pulses appearing in the output of the encoder for this condition are shown in Fig. 6(f).

The output circuit of $V_{25}$ is coupled to the output transmission line 119 through transformer 120 and amplifier stage $V_{26}$. In order to have the initial triggering pulse appear in the output circuit of the encoder this pulse is applied to the primary of transformer 120 by means of the mixer stage $V_{27}$.

What I claim is:

1. A pulse encoder comprising an oscillator, keying means for rendering said oscillator operative for a given period of time, said keying means being designed to be triggered by an initial triggering pulse, means for converting the output of said oscillator into a series of sharp pulses equally spaced with respect to time, a coincidence amplifier, means for applying said equally spaced pulses to said coincidence amplifier, a plurality of delay pulse producing means, means causing said delay pulse producing means to be triggered by said initial triggering pulse, means for adjusting the lengths of the pulses produced by said delay pulse producing means, means for differentiating the trailing edges of said delay pulses for producing sharp triggering pulses therefrom, a gate producing means, means for selectively connecting said differentiating means to said gate producing means whereby said triggering pulses may be used to initiate operation of said gate producing means, means for applying the gate pulse from said gate producing means to said coincidence amplifier whereby said amplifier is caused to pass the pulse of said series of equally spaced pulses occurring within the time interval of said gate pulse.

2. Apparatus as claimed in claim 1 in which means are provided for causing the initial triggering pulse to appear in the output of the coincidence amplifier.

3. A pulse encoder comprising means for generating a series of pulses occurring at equal intervals of time, a coincidence amplifier, means for applying said series of pulses to said coincidence amplifier, means for generating gating pulses of substantially longer duration than the pulses in said series, a plurality of delay pulse producing means for producing a plurality of delay pulses of different lengths, means for initiating operation of said delay pulse producing means concurrently with the beginning of said series of pulses, means for converting the trailing edges of said delay pulses into sharp trigger pulses, means for selectively applying a desired combination of said trigger pulses to said gating pulse producing means to initiate operation thereof, and means for applying said gating pulses to said coincidence amplifier whereby said amplifier is rendered operative during the time a gating pulse is applied thereto and whereby those pulses of said series of pulses are selected that are applied to said coincidence amplifier concurrently with said gating pulses.

4. A pulse encoder adapted to be set into operation by an initial trigger pulse and operating to produce one or more secondary pulses occurring after said trigger pulse at multiples of a fixed time interval, said encoder comprising means responsive to said initial trigger pulse for producing a series of secondary pulses separated by said fixed time interval, a coincidence amplifier, means for applying said series of secondary pulses to said coincidence amplifier, means for generating gating pulses of greater duration than said secondary pulses and of less duration than said fixed time interval, delay pulse producing means responsive to said initial trigger pulse and operating to produce a plurality of delay pulses each having a length less than a multiple of said fixed time interval by an amount less than the length of a gating pulse, selective means for causing said delay pulse producing means to generate a desired combination of delay pulses, means for producing additional trigger pulses from the trailing edges of said delay pulses, selective means for applying a desired combination of said additional trigger pulses to said gating pulse generating means to cause operation thereof, means for applying said gating pulses to said coincidence amplifier whereby said amplifier is rendered operative for the duration of each gating pulse, output circuit means connected to the output circuit of said coincidence amplifier, and means for causing said initial trigger pulse to appear in said output circuit means.

5. Apparatus as claimed in claim 4 in which said means for producing gating pulses and said delay pulse producing means comprise one-cycle multivibrators.

References Cited in the file of this patent

UNITED STATES PATENTS

| | | |
|---|---|---|
| 2,266,401 | Reeves | Dec. 16, 1941 |
| 2,403,561 | Smith | July 9, 1946 |
| 2,403,873 | Mumma | July 9, 1946 |
| 2,407,320 | Miller | Sept. 10, 1946 |
| 2,409,229 | Smith | Oct. 15, 1946 |